(12) United States Patent
Adamson et al.

(10) Patent No.: US 10,931,703 B2
(45) Date of Patent: Feb. 23, 2021

(54) THREAT COVERAGE SCORE AND RECOMMENDATIONS

(71) Applicant: ProSOC, Inc., Carlsbad, CA (US)

(72) Inventors: Ken Adamson, Winchester, CA (US); Jordan Knopp, Carlsbad, CA (US); Bradley Houston Taylor, Newport Coast, CA (US)

(73) Assignee: ProSOC, Inc., Carlsbad, CA (US)

( * ) Notice: Subject to any disclaimer, the term of this patent is extended or adjusted under 35 U.S.C. 154(b) by 290 days.

(21) Appl. No.: 16/003,987

(22) Filed: Jun. 8, 2018

(65) Prior Publication Data

US 2019/0327260 A1 Oct. 24, 2019

Related U.S. Application Data

(60) Provisional application No. 62/662,145, filed on Apr. 24, 2018.

(51) Int. Cl.
*H04L 9/00* (2006.01)
*H04L 29/06* (2006.01)
*H04L 12/26* (2006.01)

(52) U.S. Cl.
CPC ........ *H04L 63/1433* (2013.01); *H04L 43/065* (2013.01); *H04L 63/1425* (2013.01)

(58) Field of Classification Search
CPC .............. H04L 63/065; H04L 63/1425; H04L 63/1433
See application file for complete search history.

(56) References Cited

U.S. PATENT DOCUMENTS

| | | | |
|---|---|---|---|
| 9,992,230 B1 * | 6/2018 | Haverty | H04L 63/20 |
| 2012/0232948 A1 * | 9/2012 | Wolf | G06Q 10/067 |
| | | | 705/7.28 |
| 2016/0162690 A1 * | 6/2016 | Reith | G06F 21/577 |
| | | | 726/25 |
| 2018/0020018 A1 * | 1/2018 | Walheim | G06F 21/57 |

* cited by examiner

*Primary Examiner* — Beemnet W Dada
(74) *Attorney, Agent, or Firm* — Womble Bond Dickinson (US) LLP

(57) ABSTRACT

Embodiments of the disclosure are related to a method, apparatus, and system for generating scores for the security threat coverage in a client network based on collected network environment data, comprising: determining a client device list; creating a client-specific threat matrix based on the client device list and a general threat matrix; and determining one or more security threat coverage scores for the client network based on the client-specific threat matrix.

12 Claims, 8 Drawing Sheets

| Category | Brute Force Attack | Dictionary Attack | Adware | Drive-By Downlaods | Exploit Kit | Remote Access Trojan |
|---|---|---|---|---|---|---|
| Analytics | 1 | 1 | 0 | 1 | 1 | 1 |
| AV | 0 | 0 | 1 | 1 | 1 | 1 |
| Change_Management_Auditing | 0 | 0 | 0 | 0 | 0 | 0 |
| Cloud_Infrastructure | 0 | 0 | 0 | 0 | 0 | 0 |
| Device_Management | 0 | 0 | 0 | 0 | 0 | 0 |
| DHCP | 0 | 0 | 0 | 0 | 0 | 0 |
| DLP | 0 | 1 | 0 | 0 | 0 | 0 |
| DNS | 0 | 0 | 0 | 0 | 0 | 0 |
| Domain_Controller | 1 | 0 | 0 | 0 | 0 | 0 |
| Email_Filter | 0 | 0 | 0 | 0 | 1 | 0 |
| Encryption | 0 | 0 | 0 | 0 | 0 | 0 |

FIG. 3

Recommendations (Perimeter)    ← 161

| Category ◊ | Additional Threats Covered ◊ |
|---|---|
| VPN | Credential Reuse<br>Dictionary Attack<br>Session Hijacking/ MitM<br>Unauthorized Access |
| WAF | Dictionary Attack<br>SQL Injection<br>Session Hijacking/MitM<br>XSS |
| Web Filter | URL Injection<br>Web Page Defacing<br>XSS |

FIG. 5

THREAT COVERAGE SCORE AND RECOMMENDATIONS

CROSS REFERENCE TO RELATED APPLICATION

This application claims the benefit of the earlier filing date of U.S. Provisional Application No. 62/662,145, filed on Apr. 24, 2018, the entirety of which is incorporated herein by reference.

FIELD

Embodiments of the disclosure are related to computer networks, and more particularly, to threat assessment in a networked environment.

RELEVANT BACKGROUND

The General Data Protection Regulation (GDPR) of the European Union and the U.S. Securities and Exchange Commission (SEC) released new requirements for companies to disclose the kinds of vulnerabilities in their computer networks against which they are not protected.

BRIEF DESCRIPTION OF THE DRAWINGS

FIG. 3 is a diagram illustrating a part of a Threat Matrix, according to one embodiment of the disclosure.

FIG. 5 is a diagram illustrating a part of a list of recommended security device categories, according to one embodiment of the disclosure.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments. Embodiments of disclosure described herein may relate to functionality implemented across multiple devices. Obvious communications (e.g., transmissions and receipts of information) between the devices may have been omitted from the description in order not to obscure the disclosure.

Embodiments of the disclosure are directed to a method, apparatus, and system for generating scores for the security threat coverage in a networked environment based on collected network environment data. Additional embodiments of the disclosure are directed to a method, apparatus, and system for generating security device recommendations for a networked environment.

A client network may comprise a plurality of areas. In one embodiment, the network may comprise four areas: Perimeter, Core, Endpoint, and Cloud. The Perimeter area represents the security controls that are at the outer edge of the network between the client's private network and the public internet The security controls include devices such as Firewalls, Next Generation Firewalls, Intrusion Detection Systems (IDS), Intrusion Prevention Systems (IPS), Web Application Firewalls, etc. The Core area consists of internal security controls and network devices running or providing essential network services. These services include Domain Name Service (DNS), Active Directory, Dynamic Host Configuration Protocol (DHCP), application servers, database servers, etc. The Endpoint area consists of devices that users directly interact with, such as servers, desktops, workstations, laptops, Personal Digital Assistants (PDAs), mobile phones, and tablets, and security controls such as Antivirus module/software, Endpoint Protection module/software, Endpoint Detection and Response module/software, etc. And the Cloud area consists of Software-as-a-Service (e.g., Microsoft Office 365, ServiceNow, etc.) and Infrastructure-as-a-Service (e.g., Amazon AWS, Microsoft Azure, Google Cloud, etc.).

Figure 1:
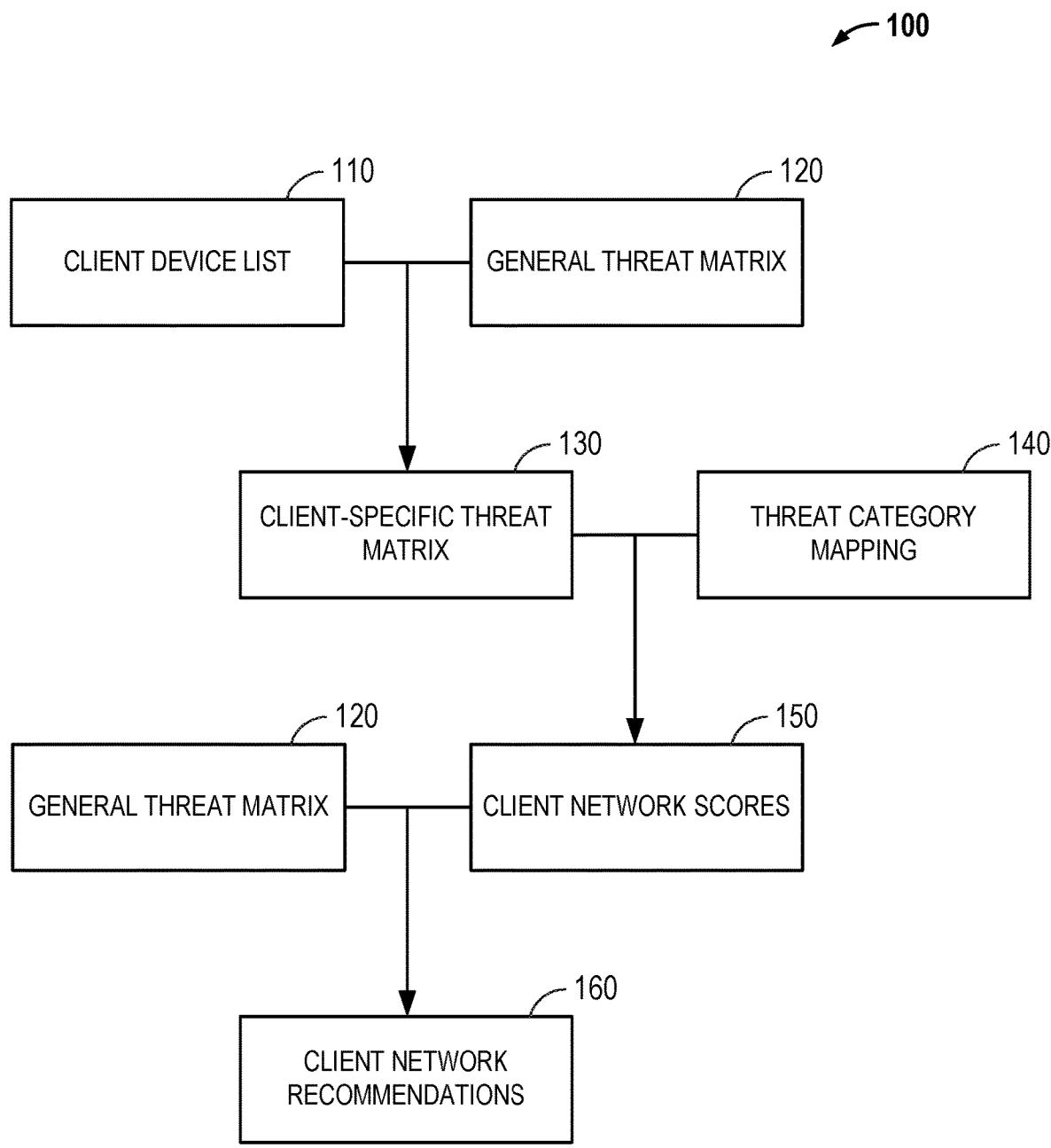
FIG. 1 is a block diagram illustrating an overall structure of a method, apparatus, and system for generating security threat coverage scores and security recommendations for a networked environment, according to one embodiment of the disclosure.
Figure 2:
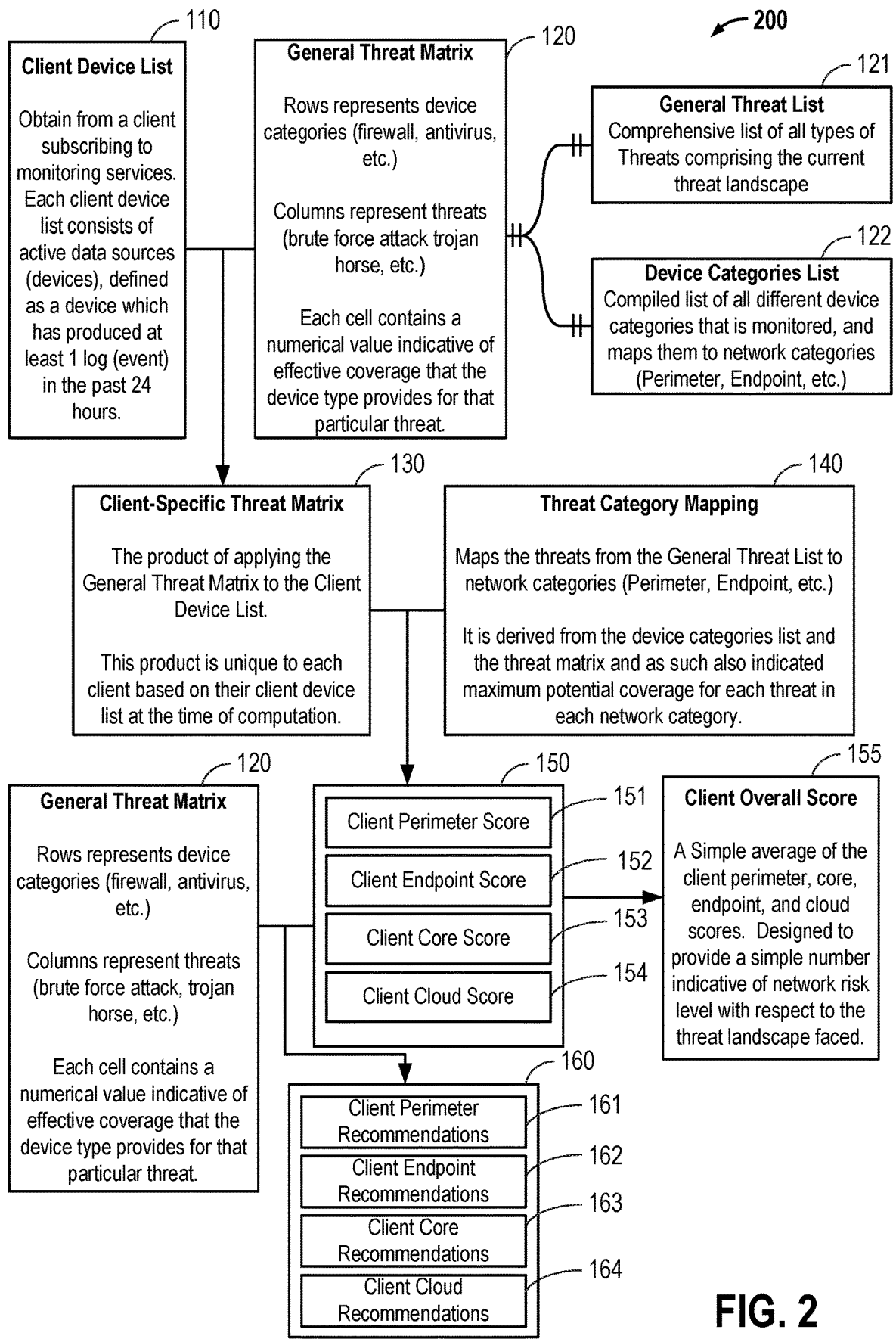
FIG. 2 is a block diagram illustrating an overall structure of a method, apparatus, and system for generating security threat coverage scores and security recommendations for a networked environment, according to one embodiment of the disclosure.

Referring to FIGS. 1 and 2, block diagrams 100, 200 illustrating an overall structure of a method, apparatus, and system for generating security threat coverage scores and security recommendations for a networked environment, according to one embodiment of the disclosure, are shown.

A Client Device List 110 may be determined. The devices contained in the list 110 may comprise active security devices in the client's network. A security device may refer to a networked device that protects at least an on area of the network against one or more types of cyber threats. A security device may be deemed active if it has recent activity (e.g., if it has produced at least one log/event in the past 24 hours; some devices may be "quieter" and produce logs/events less frequently but still considered active). Based on the function of the security devices, each device may be associated with a category (e.g., firewall, antivirus, etc.). Further, in one embodiment, each device category is associated with an area of the network (e.g., Perimeter, Core, Endpoint, or Cloud).

Based on the Client Device List 110 and a General Threat Matrix 120, a Client-Specific Threat Matrix 130 may be created. The General Threat Matrix may include information relating to the level of protection against any type of threat (e.g., brute force attack, Trojan horse, etc.) provided by any category of security devices (e.g., firewall, antivirus, etc.). The level of protection may be a binary indication (Yes/No, 1/0, etc.), or may be specified at a finer granularity (5-grade scale, 10-grade scale, 100-grade scale, etc.). In one embodiment, the rows in the General Threat Matrix 120 represent device categories, and the columns represent threat types. The General Threat Matrix 120 may be updated based on latest discoveries and understandings, and may be maintained by a service provider (e.g., a network security service provider).

Thus, the Client-Specific Threat Matrix 130, which is generated based on the Client Device List 110, is a profile that comprises information relating to the Client's currently available level of protection against any type of threat.

Based on the Client-Specific Threat Matrix 130, one or more security threat coverage scores 150 may be determined for the client network. Each area of the network may be associated with one security threat coverage score 150. In one embodiment, a network may comprise four areas: Perimeter, Core, Endpoint, and Cloud. Thus, four security threat coverage scores 150 including: a Perimeter security threat coverage score 151, an Endpoint security threat coverage score 152, a Core security threat coverage score 153, and a Cloud security threat coverage score 154, may be determined. In one embodiment, each security threat coverage score may be determined based on a comparison (e.g., calculating a ratio) between the number of threat types against which protection is currently available and the maximum possible (total) number of known threat types in the particular area of the network. For example, if a client has three perimeter devices that provide coverage (protection) for 12 types of threats, and there are 24 types of possible threats within the Perimeter category/area, the client's Perimeter security threat coverage score 151 would be 12/24=50% (which can be stylized simply as "50").

It should be appreciated that the maximum possible number of threat types in an area of the network may be derived from the General Threat Matrix 120. In one embodiment, a general threat list 121, which comprises all types of presently-known threats, and a device categories list 122, which comprises known security device categories (e.g., firewall, antivirus, etc.) and the network areas (e.g., Perimeter, Endpoint, Core, and Cloud) with which each category of security device is associated, may be derived based on the General Threat Matrix 120. The security threat coverage scores 150 may be on a 100-point scale, in which a higher score is indicative of a higher security threat coverage level. Of course, the scale used for the scoring does not limit the disclosure. In a further embodiment, an overall score 155 may be determined (e.g., by averaging all network area-specific security threat coverage scores).

In one embodiment, a list of recommended security devices 160 may be further generated for the client network. In one embodiment, the list may comprise sub-lists each of which correspond to a particular area of the client network (e.g., Perimeter, Core, Endpoint, Cloud, etc.). Thus, the list may comprise Perimeter area recommendations 161, Endpoint area recommendations 162, Core area recommendations 163, and Cloud area recommendations 164. The list 160 may comprise device categories that would provide protection against threat types against which protection is not currently available in the client network. In one embodiment, device categories that would provide protection against the highest number of additional threat types may be preferred for inclusion in the list.

Referring to FIG. 3, a diagram 300 illustrating a part of a Threat Matrix, according to one embodiment of the disclosure, is shown. The Threat Matrix of FIG. 3 may be a part of a General Threat Matrix 120 or a part of Client-Specific Threat Matrix 130. The rows in the Threat Matrix represent device categories, and the columns represent threat types. The values in the cells represent the level of protection against the particular threat type provided by the particular device category.

Figure 4:
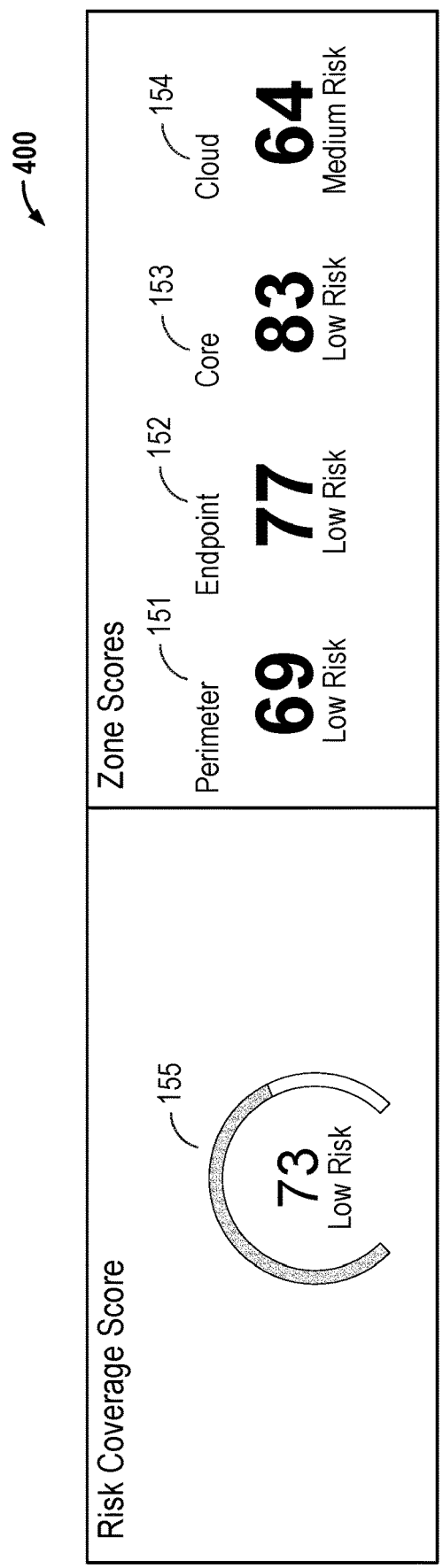
FIG. 4 is a diagram illustrating security threat coverage scores, according to one embodiment of the disclosure.

Referring to FIG. 4, a diagram 400 illustrating security threat coverage scores 150, according to one embodiment of the disclosure, is shown. There is one score 151-154 for each area of the network (Perimeter, Endpoint, Core, or Cloud). Furthermore, an overall score 155 is generated by averaging all the scores for the individual areas of the network.

Referring to FIG. 5, a diagram illustrating a part of a list 161 of recommended security device categories, according to one embodiment of the disclosure, is shown. The part of the list 161 shown in FIG. 5 is a part of the sub-list relating to the Perimeter area of the network. The recommended device categories and the additional threat types covered by each of the recommended device category are indicated.

Figure 6:
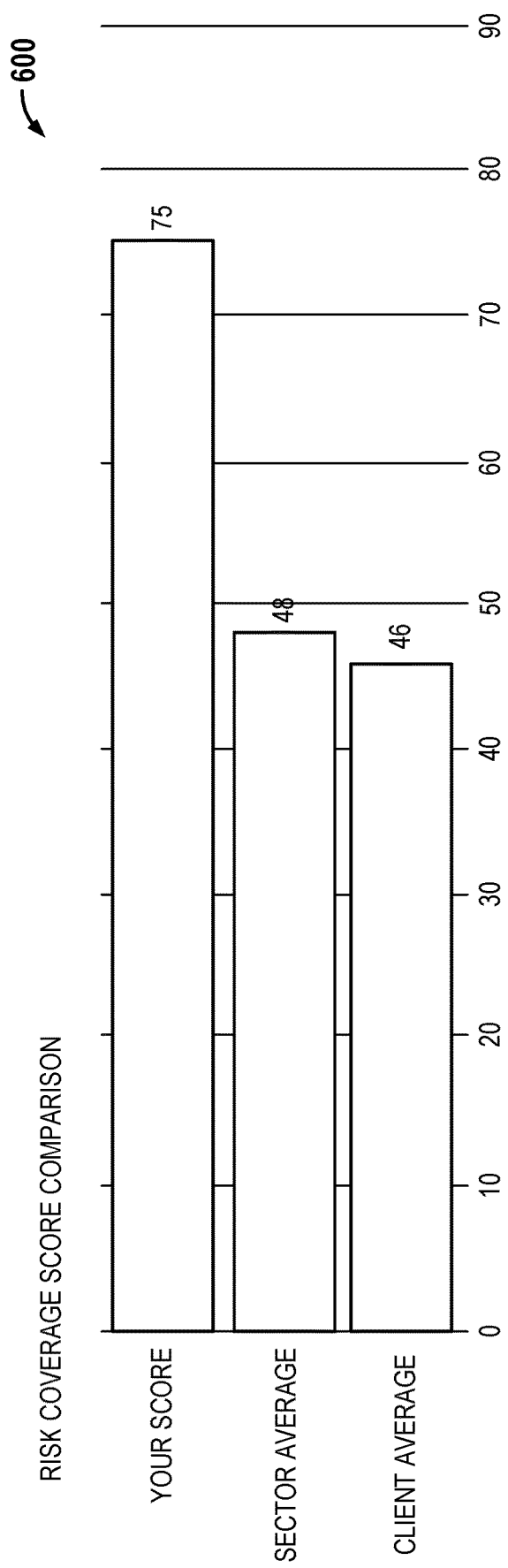
FIG. 6 is a diagram illustrating a security threat coverage score comparison graph.

Referring to FIG. 6, a diagram illustrating a security threat coverage score comparison graph 600 is shown. FIG. 6 illustrates a visual comparison of the overall score of a client (e.g., 75 points), and how this compares to both the average score amongst the client's peers in the same business sector as them (e.g., 48 points), and the overall client average across all sectors (e.g., 46 points). If there is an insufficient number of peers in the client's sector to calculate a meaningful average, then this section of the graph may be hidden to the client.

Figure 7:
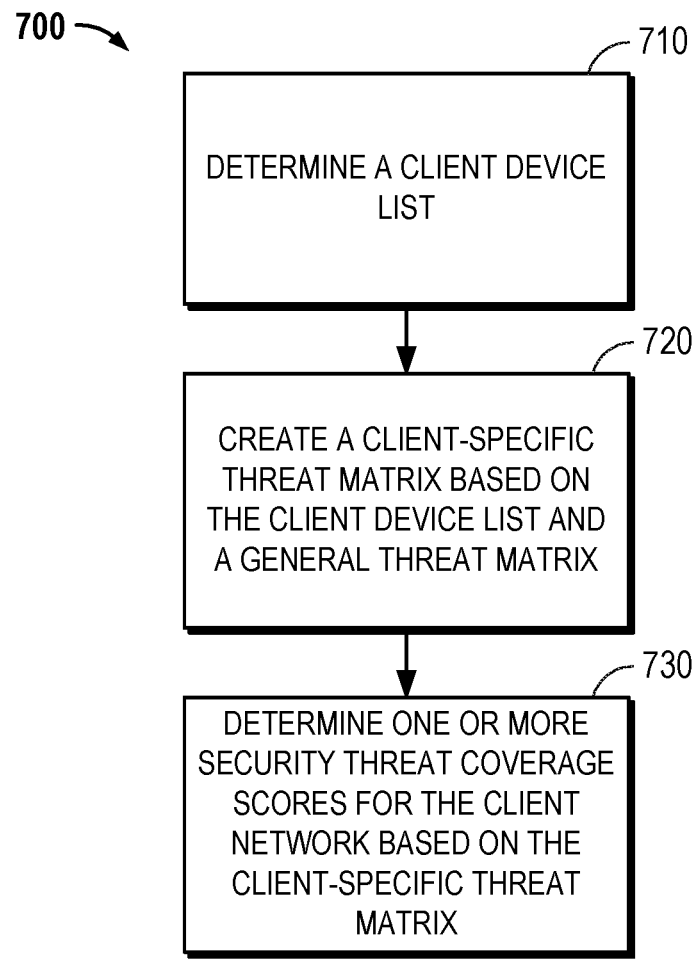
FIG. 7 is a flowchart illustrating an example method for generating security threat coverage scores in a client network based on collected network environment data, according to one embodiment of the disclosure.

Referring to FIG. 7, a flowchart illustrating an example method 700 for generating security threat coverage scores in a client network based on collected network environment data, according to one embodiment of the disclosure, is shown. At block 710, a client device list is determined. At block 720, a client-specific threat matrix is created based on the client device list and a general threat matrix. At block 730, one or more security threat coverage scores for the client network are determined based on the client-specific threat matrix.

Figure 8:
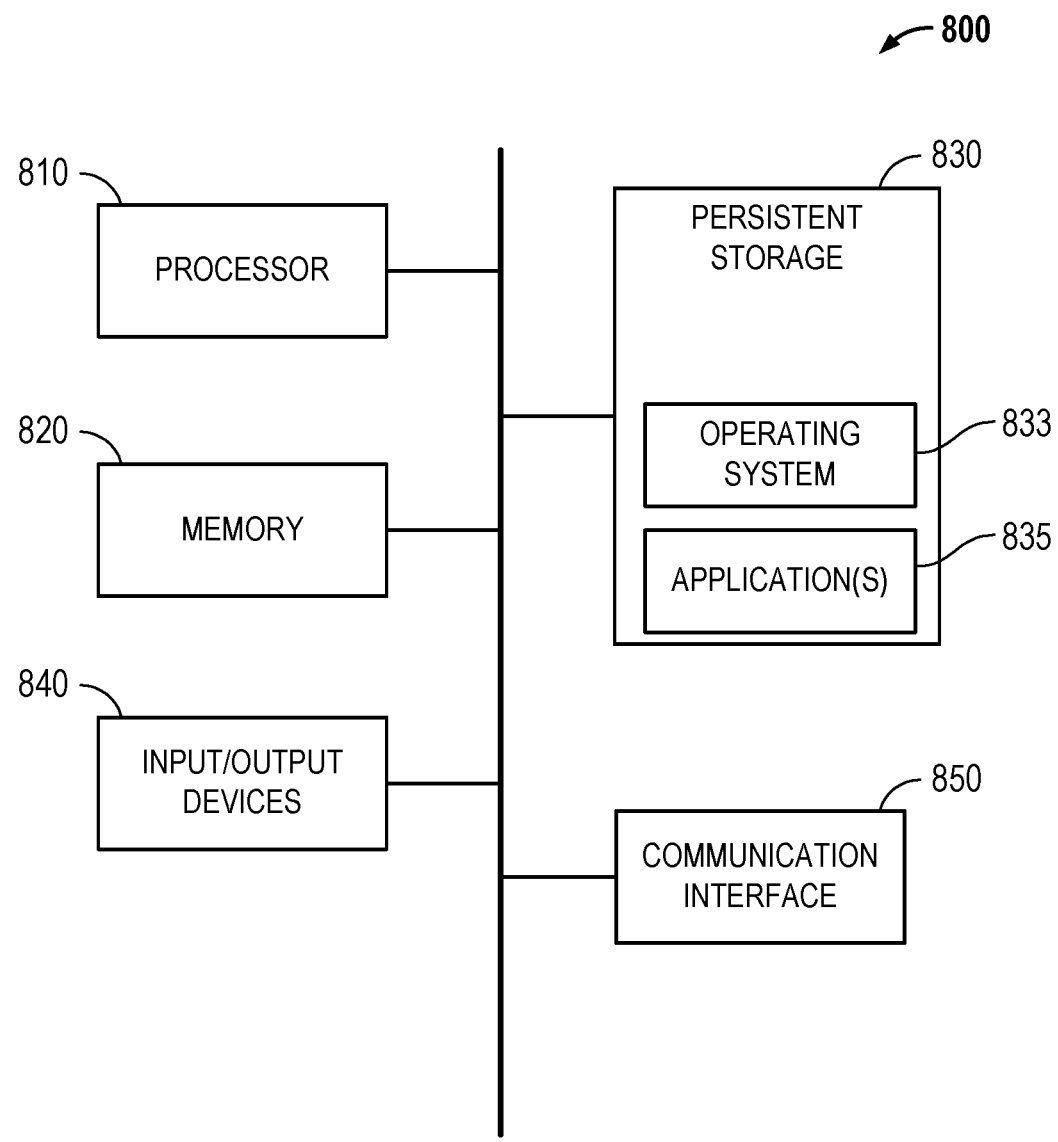
FIG. 8 is a block diagram illustrating an example computing device, according to embodiments of the disclosure.

Referring to FIG. 8, a block diagram illustrating an example computing device 800 according to embodiments of the disclosure is shown. The device may comprise a processor 810, a memory 820, a persistent storage 830, one or more input/output devices 840, and a communication interface 850. The memory 820 may comprise a random access memory (RAM) and a read-only memory (ROM). An operating system 833 and one or more applications 835 may be stored in the persistent storage 830. The code stored in the persistent storage 830 may be loaded into the memory 820 and executed by the processor 810. When code is executed by the processor 810, the device 800 may perform one or more functions based on the code, such as the operating system 833 or the applications 835. The one or more applications 835 may be adapted for various functions and purposes. The communication interface 850 may enable the device 800 to communicate with one or more other devices using one or more known wired or wireless communication protocols.

Merely by way of example, one or more procedures described with respect to the method(s) discussed below may be implemented as code and/or instructions executable by a device (and/or a processor within a device). A set of these instructions and/or code may be stored on a non-transitory computer-readable storage medium, such as the persistent storage device(s) 830 described above. In some cases, the storage medium might be incorporated within a computer system, such as the device 800. In other embodiments, the storage medium might be separate from the devices (e.g., a removable medium, such as a compact disc), and/or provided in an installation package, such that the storage medium can be used to program, configure, and/or adapt a computing device with the instructions/code stored thereon. These instructions might take the form of executable code, which is executable by the device 800 and/or might take the form of source and/or installable code, which, upon compilation and/or installation on the device 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

It should be appreciated that aspects of the previously described processes may be implemented in conjunction with the execution of instructions by a processor (e.g., processor 810) of a device (e.g., device 800), as previously described. Particularly, circuitry of the devices, including but not limited to processors, may operate under the control of a program, routine, or the execution of instructions to execute methods or processes in accordance with embodiments described (e.g., the processes and functions of FIGS. 1, 2, and 7). For example, such a program may be implemented in firmware or software (e.g. stored in memory and/or other locations) and may be implemented by processors and/or other circuitry of the devices. Further, it should be appreciated that the terms device, processor, microprocessor, circuitry, controller, SoC, etc., refer to any type of logic or circuitry capable of executing logic, commands, instructions, software, firmware, functionality, etc.

It should be appreciated that when the devices are wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, 5G, CDMA, TDMA, OFDM, OFDMA, WiMAX, Wi-Fi, Bluetooth, Zigbee, LoRA, and Narrowband-IoT (NB-IoT). Similarly, a wireless device may support or otherwise use one or more of a variety of corresponding modulation or multiplexing schemes. A wireless device may thus include appropriate components (e.g., communication subsystems/interfaces (e.g., air interfaces)) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a virtual reality or augmented reality device, a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for generating security threat coverage scores in a client network based on collected network environment data, comprising:
    determining a client device list;
    creating a client-specific threat matrix based on the client device list and a general threat matrix; and
    determining one or more security threat coverage scores for the client network based on the client-specific threat matrix, wherein the client device list comprises active security devices present the client network, the general threat matrix comprises known security device categories, each of which is associated with one of one or more network areas, and threats against which each of them protects, and the client-specific threat matrix comprises the active security devices of the client, each of which is associated with one of the one or more network areas, and threats against which each of them protects.

2. The method of claim 1, wherein a security threat coverage score is determined based on a comparison between a number of threat types against which protection is available and a total number of known threat types.

3. The method of claim 1, wherein the security threat coverage scores comprise a score for each of Perimeter, Endpoint, Core, and Cloud areas of the client network.

4. The method of claim 3, wherein the security threat coverage scores further comprise an overall security threat coverage score, wherein the overall security threat coverage score is an average of the individual security threat coverage scores for all areas of the client network.

5. The method of claim 1, further comprising generating one or more device recommendations, wherein a recommended device, if installed, improves at least one of the security threat coverage scores.

6. The method of claim 5, wherein the device recommendations are associated with one of Perimeter, Endpoint, Core, and Cloud areas of the client network.

7. A non-transitory computer-readable medium comprising code which, when executed by a processor, causes the processor to execute a method for generating security threat coverage scores in a client network based on collected network environment data, comprising:
    determining a client device list;
    creating a client-specific threat matrix based on the client device list and a general threat matrix; and
    determining one or more security threat coverage scores for the client network based on the client-specific threat matrix, wherein the client device list comprises active security devices present the client network, the general threat matrix comprises known security device categories, each of which is associated with one of one or more network areas, and threats against which each of them protects, and the client-specific threat matrix comprises the active security devices of the client, each of which is associated with one of the one or more network areas, and threats against which each of them protects.

8. The non-transitory computer-readable medium of claim 7, wherein a security threat coverage score is determined based on a comparison between a number of threat types against which protection is available and a total number of known threat types.

9. The non-transitory computer-readable medium of claim 7, wherein the security threat coverage scores comprise a score for each of Perimeter, Endpoint, Core, and Cloud areas of the client network.

10. The non-transitory computer-readable medium of claim 9, wherein the security threat coverage scores further comprise an overall security threat coverage score, wherein the overall security threat coverage score is an average of the individual security threat coverage scores for all areas of the client network.

11. The non-transitory computer-readable medium of claim 7, further comprising generating one or more device recommendations, wherein a recommended device, if installed, improves at least one of the security threat coverage scores.

12. The non-transitory computer-readable medium of claim 11, wherein the device recommendations are associated with one of Perimeter, Endpoint, Core, and Cloud areas of the client network.

* * * * *